US010240461B2

(12) United States Patent
Ratzlaff et al.

(10) Patent No.: US 10,240,461 B2
(45) Date of Patent: Mar. 26, 2019

(54) STATOR RIM FOR A TURBINE ENGINE (71) Applicant: General Electric Company, Schenectady, NY (US)

(72) Inventors: Jonathan Russell Ratzlaff, Loveland, OH (US); Julius John Montgomery, Mason, OH (US); Michael Thomas Hogan, Tewksbury, MA (US)

(73) Assignee: General Electric Company, Schenectady, NY (US)

( * ) Notice: Subject to any disclaimer, the term of this patent is extended or adjusted under 35 U.S.C. 154(b) by 248 days.

(21) Appl. No.: 14/990,885

(22) Filed: Jan. 8, 2016

(65) Prior Publication Data
US 2017/0198585 A1 Jul. 13, 2017

(51) Int. Cl.
F01D 5/08 (2006.01)
F01D 11/00 (2006.01)
F01D 11/04 (2006.01)
F01D 9/04 (2006.01)
F01D 25/12 (2006.01)

(52) U.S. Cl.
CPC ............. *F01D 5/081* (2013.01); *F01D 5/082* (2013.01); *F01D 9/041* (2013.01); *F01D 11/001* (2013.01); *F01D 11/04* (2013.01); *F01D 25/12* (2013.01); *F05D 2220/32* (2013.01); *F05D 2240/128* (2013.01); *Y02T 50/676* (2013.01)

(58) Field of Classification Search
CPC .......... F01D 5/081; F01D 5/082; F01D 5/087; F01D 9/041; F01D 11/001; F01D 11/04; F01D 25/12; F02C 7/00; F02C 7/143; F02C 7/16; F02C 7/125; F02C 7/18
See application file for complete search history.

(56) References Cited

U.S. PATENT DOCUMENTS

| 5,222,742 | A  | 6/1993 | Roberts |
| 6,402,471 | B1 | 6/2002 | Demers et al. |
| 7,334,983 | B2 | 2/2008 | Alvanos et al. |

(Continued)

FOREIGN PATENT DOCUMENTS

| JP | H10-184312 A | 7/1998 |
| JP | 2010-077868 A | 4/2010 |
| WO | 2012/028424 A1 | 3/2012 |

OTHER PUBLICATIONS

Extended European Search Report and Opinion issued in connection with corresponding EP Application No. 16205922.4 dated May 10, 2017.

(Continued)

*Primary Examiner* — Justin Seabe
*Assistant Examiner* — Brian P Wolcott
(74) *Attorney, Agent, or Firm* — General Electric Company; Kristi Davidson (57) ABSTRACT A stator rim structure for a gas turbine engine comprises a stator having an end wall and a discourager defining a channel therebetween. The end wall is adjacent to a hot gas flow and the discourager is adjacent to a purge flow. A rotor has an angel wing extending into the channel. At least one supply passage is disposed within the stator and extends through the discourager and at least one aperture fluidly couples the supply passage with the channel. A flow of cooling air is fed from the supply passage into the aperture and into the channel to form a fluidic dam discouraging ingestion of the hot gas flow.

16 Claims, 5 Drawing Sheets (56) References Cited

U.S. PATENT DOCUMENTS

| | | |
|---|---|---|
| 8,038,399 B1 | 10/2011 | Liang |
| 8,277,177 B2 | 10/2012 | Liang |
| 8,522,558 B1 | 9/2013 | Xu |
| 8,753,070 B2 | 6/2014 | Gomez |
| 9,175,565 B2 * | 11/2015 | Porter .................. F01D 5/081 |
| 2002/0159880 A1 | 10/2002 | Morris et al. |
| 2007/0025854 A1 | 2/2007 | Moore et al. |
| 2011/0129342 A1 | 6/2011 | Smoke et al. |
| 2013/0156598 A1 * | 6/2013 | Davis .................. F01D 5/082 |
| | | 416/96 R |
| 2013/0170983 A1 * | 7/2013 | Babu .................... F01D 11/04 |
| | | 416/1 |
| 2013/0302136 A1 | 11/2013 | Grover et al. |
| 2014/0037435 A1 | 2/2014 | Porter et al. |
| 2014/0321961 A1 | 10/2014 | Beattie et al. |

OTHER PUBLICATIONS

First Office Action and Search issued in connection with corresponding CN Application No. 201710013030.X dated Apr. 16, 2018.

\* cited by examiner

STATOR RIM FOR A TURBINE ENGINE

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft comprise multiple compressor stages designed with a plurality of bands of blades rotated by a rotor and bands of static vanes disposed between the blades. The compressor stages compress the air that is then moved to a combustor and a turbine. The compressor vanes are disposed with seals, limiting airflow leakage to upstream areas of the compressor, which can reduce efficiency of the system. Additionally, a purge flow can be introduced to combat airflow ingestion, which can otherwise leak to the upstream compressor areas.

BRIEF DESCRIPTION OF THE INVENTION

In a first aspect, a structure for a gas turbine engine includes a stator having an end wall and a discourager defining a channel therebetween. The structure also has the end wall adjacent to a hot gas flow and the discourager adjacent to a purge flow. A rotor having an angel wing extends into the channel, with one or more supply passages disposed within the stator or the rotor, and an aperture fluidly coupling the supply passage with each channel. A flow of cooling fed from the supply passage to the aperture and into the channel forms a fluidic dam between the hot gas flow and the purge flow.

In another aspect, a method is provided for minimizing hot gas ingestion within a gas turbine engine having a stator with an end wall and a discourager, defining a channel therebetween, with a rotor angel wing disposed in the channel. The method includes providing a flow of cooling air through the discourager and injecting the cooling air from an aperture in the discourager into the channel between the end wall and the discourager.

DESCRIPTION OF EMBODIMENTS OF THE INVENTION

The described embodiments of the present invention are directed to a high pressure turbine, and in particular to preventing hot gas ingestion into a cavity between a turbine stator and rotor. For purposes of illustration, the present invention will be described with respect to the turbine for an aircraft gas turbine engine. It will be understood, however, that the invention is not so limited and can have general applicability in non-aircraft applications, such as other mobile applications and non-mobile industrial, commercial, and residential applications.

As used herein, the terms "axial" or "axially" refer to a dimension along a longitudinal axis of an engine. The term "forward" or "upstream" used in conjunction with "axial" or "axially" refers to moving in a direction toward the engine inlet, or a component being relatively closer to the engine inlet as compared to another component. The term "aft" or "downstream" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding, and do not create limitations, particularly as to the position, orientation, or use. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Figure 1:
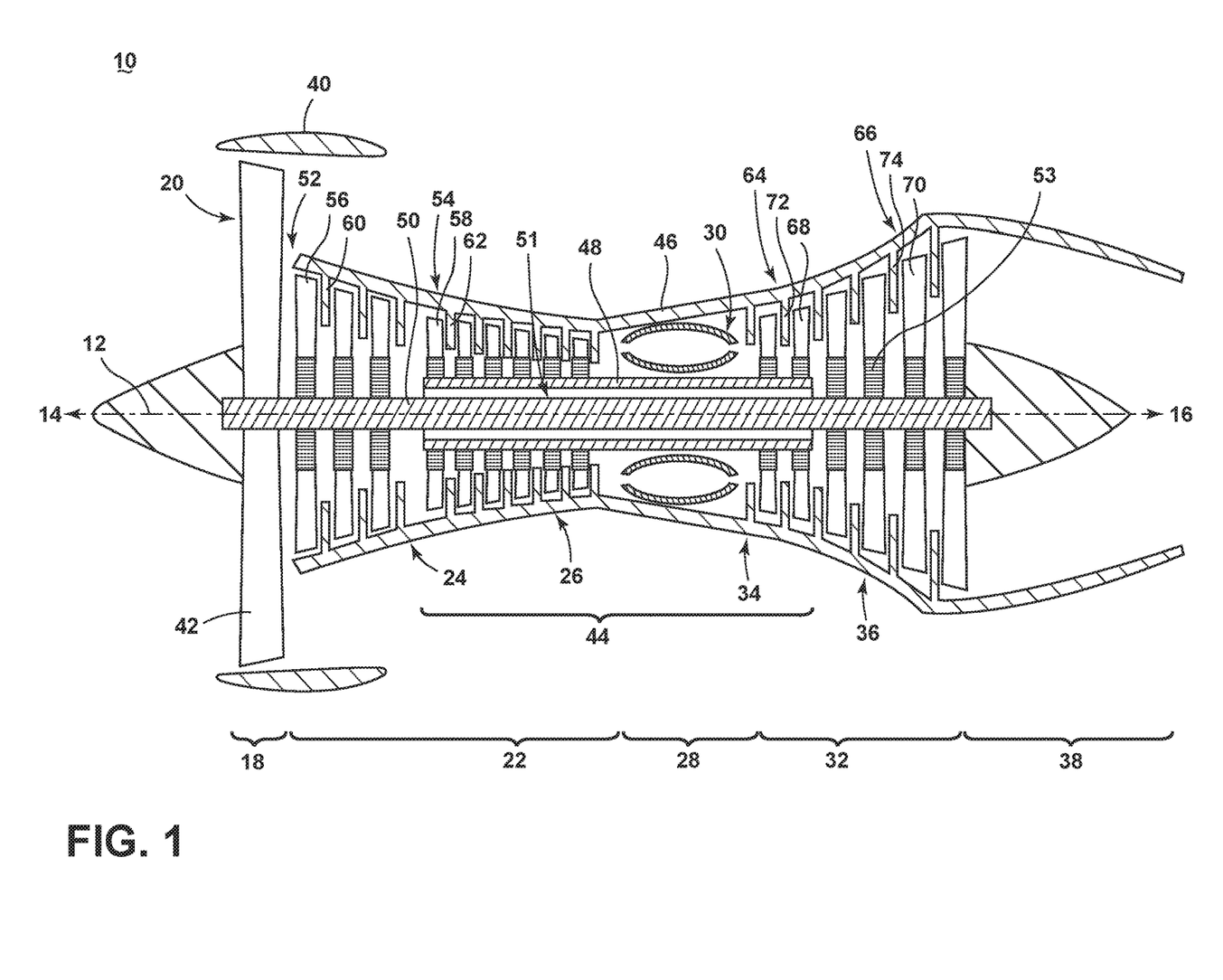
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
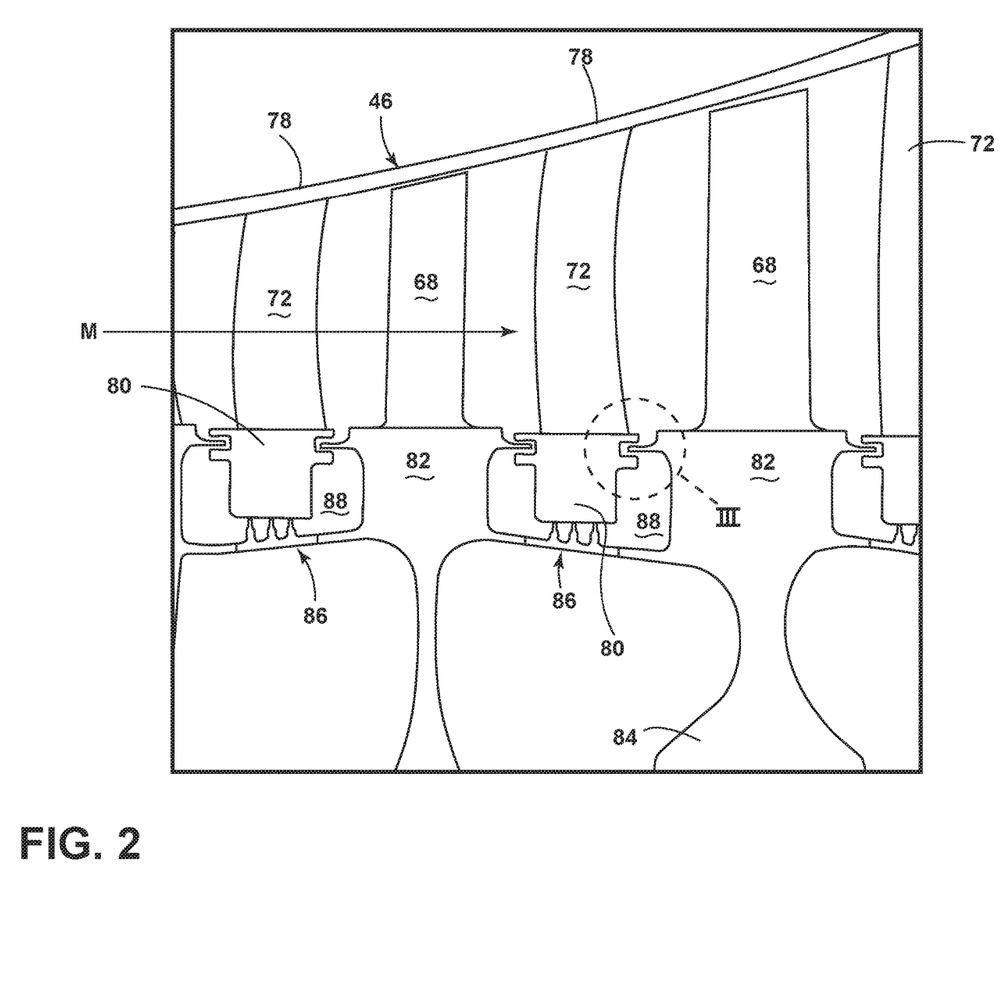
FIG. 2 is a section view of a turbine section of the gas turbine engine of FIG. 2.

FIG. 2 shows the HP turbine section 34 of FIG. 1 comprising a plurality of turbine blades 68 and turbine vanes 72. While the description herein is written with respect to a turbine, it should be appreciated that the concepts disclosed herein can have equal application to a compressor section.

Each combination of one ring of vanes 72 and one ring of blades 68 can comprise a stage. Each blade 68 mounts to a rotor 82 for supporting the blades 68 that further mounts to a disk 84. The rotor 82 is annular relative to the centerline 12 of the engine 10, such that a plurality of blades 68 can be disposed around the rotor 82. The rotor 82 can rotate about the centerline 12, such that the blades 68 rotate radially around the centerline 12.

Each vane 72 mounts at a radially outer band 78 and a radially inner band 80, with the core casing 46 comprising the radially outer band 78. The vanes 72 can mount to the radially outer band 78, being radially disposed around the engine centerline 12 similar to the blades 68. A seal 86 can mount to the disks 84 adjacent to the inner band 80, such that airflow leakage is retarded from downstream of the vanes 72 to upstream of the vanes 72. A mainstream airflow M moves in a forward to aft direction, driven by the blades 68. While the seals 86 prevent much of the upstream airflow movement, some airflow from the mainstream airflow M can leak through the seals in a direction opposite of the mainstream airflow M.

Commonly, a purge flow is fed into a cavity 88 between the seal 86 and the downstream rotor 82. The purge flow is injected into the cavity 88 to counter hot gas ingestion from the mainstream airflow M into the cavity 88. The purge flow can also cool the cavity 88 and adjacent components, however interaction between the mainstream flow M and the purge flow can be unsteady, decreasing efficiency of the turbine.

Figure 3:
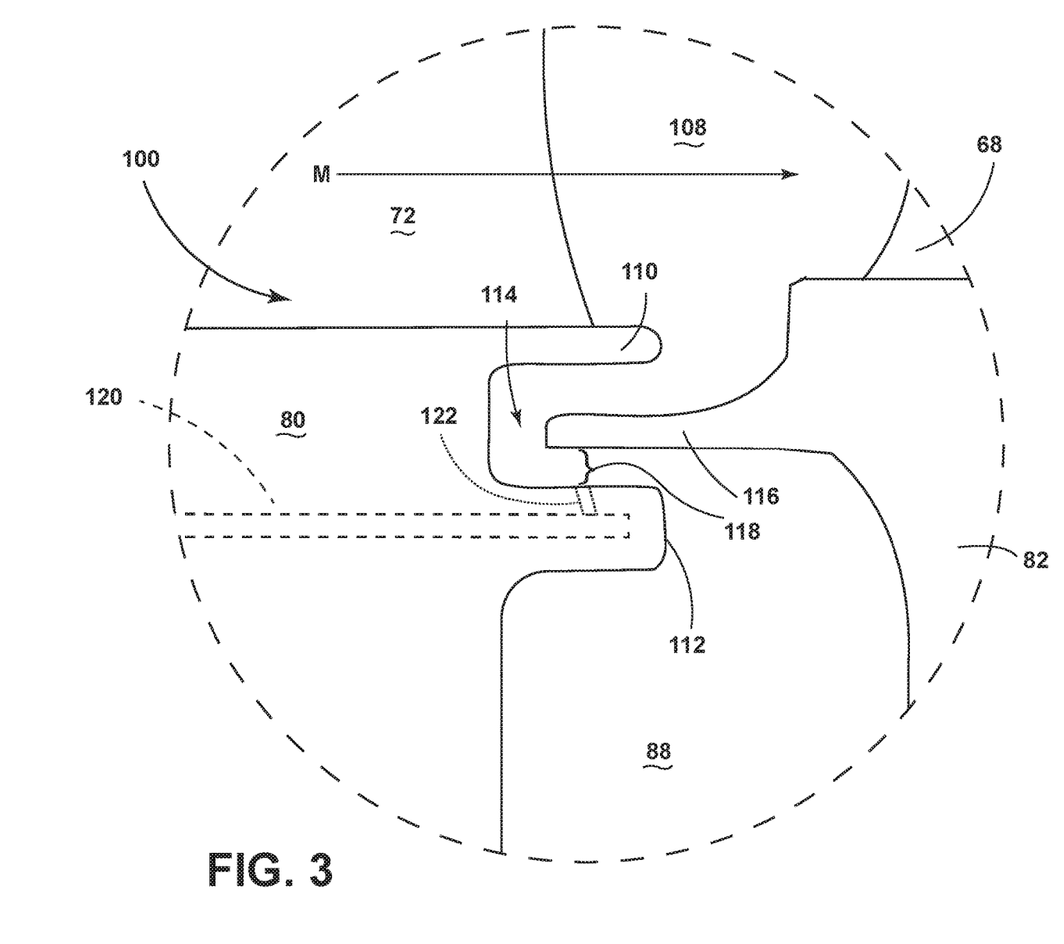
FIG. 3 is an enlarged view of a section of FIG. 2 illustrating a rotor angel wing disposed in a channel of an upstream stator.

FIG. 3 illustrates an enlarged view of the junction between the inner band 80 of the vane 72 and the rotor 82. A space 108 can be defined as the area between the vane 72 and the adjacent blade 68, within the mainstream flow M. The inner band 80 and the vane 72 can comprise a static stator 100. The stator 100 has an end wall 110 adjacent to the vane 72 and a discourager 112 opposite of the vane from the end wall 110. The end wall 110 and the discourager 112 extend axially from the inner band 80 defining a channel 114 therebetween. The end wall 110 and discourager 112 can be annular around the engine centerline, such that the channel 114 extends circumferentially around the engine centerline.

An angel wing 116 can extend axially upstream from the rotor 82 into the channel 114. The angel wing 116 can be annular, rotating within the channel 114 during rotation of the rotor 82. The angel wing 116 can be spaced from the end wall 110 and the discourager 112 defining a minimum clearance region 118 at the minimum cross-sectional area between the angel wing 116 and the end wall 110 or the discourager 112. While the minimum clearance region 118 is illustrated between the discourager 112 and the angel wing 116, it is contemplated that the minimum clearance region 118 can be disposed between the angel wing 116 and the end wall 110. Furthermore, the minimum clearance region 118 can be disposed between the angel wing 116 and the junction between the end wall 110 and the discourager 112.

A supply passage 120 can be disposed within the stator 100, extending from the inner band 80 axially into the discourager 112. An aperture 122, comprising a passage, can extend substantially radially from the supply passage 120, fluidly coupling the supply passage 120 to the channel 114. The aperture 122 can be disposed such that an outlet of the aperture 122 is at the minimum clearance region 118.

The aperture 122 can be disposed substantially radially, relative to the engine centerline. Furthermore, the aperture 122 can have a tangential component in addition to the radial disposition, being angled in the direction of rotation of the rotor 82. For example, if the rotor 82 illustrated in FIG. 3 were to rotate into the page, the aperture 122 can be angled into the page. Additionally, the aperture 122 can have an axial component. Thus, the aperture 122 can be oriented at an angle being relative to both an axial axis and a radial axis relative to the engine centerline, and tangential to the radial axis in the direction of rotation of the rotor 82. Therefore, the aperture 122 can be oriented in three-dimensional space, having an axial, radial, and tangential component.

The plurality of vanes 72 for each circumferential stator 100 can define nozzles with adjacent pairs of vanes 72. One supply passage 120 and one aperture 122 can be paired with each nozzle of the stator 100 such that a plurality of supply passages 120 and apertures are disposed circumferentially around the engine centerline. Alternatively, one supply passage 120 and aperture 122 can be paired with each vane 72. In a further example, one supply passage 120 and one aperture 122 can be disposed in the stator 100 complementary to each blade 68 disposed on the rotor 82. It should be understood that there can be more or less supply passages 120 and apertures 122 than as are described, and are not limited to the amount of vanes, nozzles, blades, or otherwise.

Figure 4:
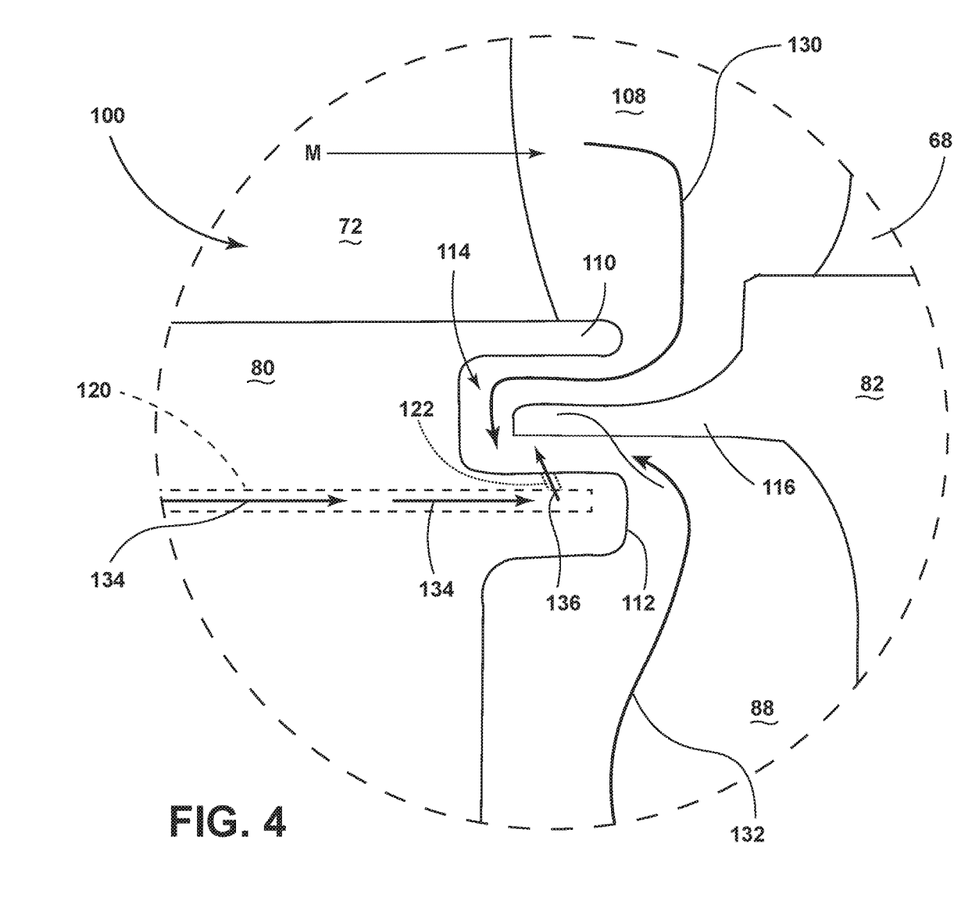
FIG. 4 is the view of FIG. 3 illustrating a fluidic flow from the stator and into the channel.

Turning now to FIG. 4, the airflow within the engine can be appreciated. The mainstream flow M moves in an aft direction from across the vane 72 toward the blade 68. A portion of the mainstream flow M can pass into the channel 114 between the stator 100 and the rotor 82 as an ingestion of hot gas flow 130. The pressure of the mainstream flow M tends to direct the hot gas flow 130 into the cavity 88 as the hot gas ingestion. A purge flow 132 can be fed to the cavity 88 to pass into the channel 114 to combat ingestion of the hot gas flow 130. The interaction or intermixing between the hot gas flow 130 and the purge flow 132 is often unsteady, and can decrease efficiency.

A flow of cooling air 134, which can be bypass air, in one example, can be fed through the supply passage 120 from within the stator 100. The cooling air 134 can be exhausted from the stator 100, through the aperture 122, and into the channel 114 as an exhaust flow 136. The exhaust flow 136 of the cooling air 134 can form a fluidic dam to discourage hot gas ingestion 130 and interaction between the purge flow 132 and the hot gas flow 130. Additionally, exhausting the exhaust flow 136 at a tangential angle in the direction of rotation, as well as at an axially upstream angle will further discourage hot gas ingestion 130 from entering the cavity 88 or intermixing with the purge flow 132. Thus, the amount of required purge flow 132 can be minimized.

Alternatively, the supply passage 120 and the aperture 122 can define a cooling air circuit. The cooling flow 134 is provided to the cooling air circuit and exhausted from the aperture 122 as an exhaust flow 136, and can form a fluidic dam between the hot gas flow 130 and the purge flow 132. The fluidic dam reduces hot gas ingestion and eventually mixes out with the mainstream flow M.

Figure 5:
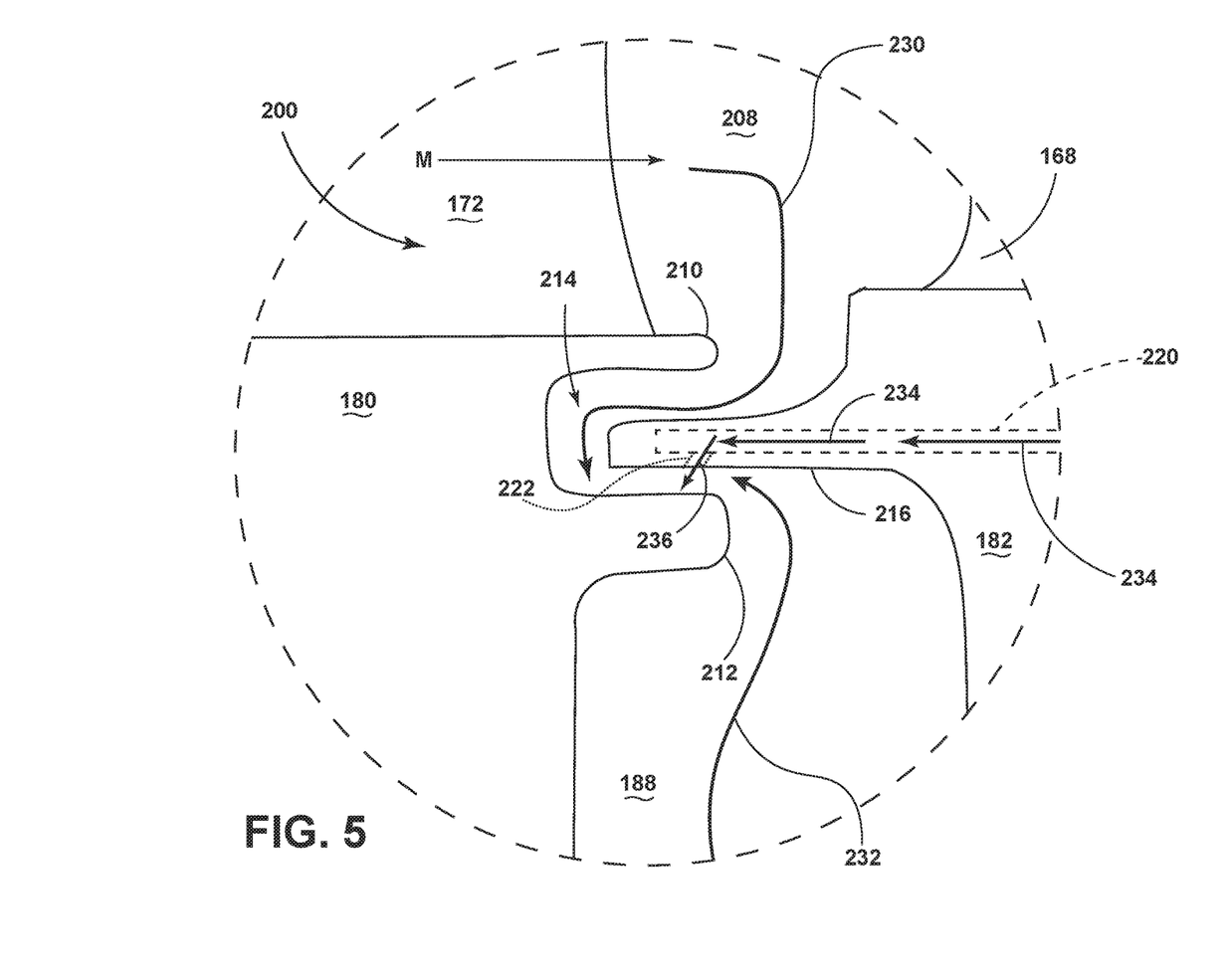
FIG. 5 is a view of an alternative embodiment having a flow of fluid passing from the rotor into the channel.

Turning now to FIG. 5, an alternative embodiment is illustrated having the supply passage 220 disposed in the rotor 82. The embodiment shown in FIG. 5 can be substantially similar to that of FIG. 4 and similar elements will be described with similar numerals increased by a value of one hundred. The supply passage 220 can extend into the angel wing 216 of the rotor 182. The aperture 222 can couple the supply passage 220 to the channel 214. The aperture 222, in comparison to FIGS. 3 and 4, is oriented to direct the cooling and exhaust airflow 234, 236 radially inward. It should be appreciated that the alternative embodiment provides for injecting a cooling flow into the channel from the rotor as compared to the stator, discouraging hot gas ingestion and reducing required purge flow.

It should be appreciated that injecting cooling air into the stator portion of the rim seal can form a fluidic dam to limit hot gas ingestion and reduce the required purge flow between a stator and a rotor. Injecting the cooling air into the seal at the minimum clearance region creates the fluidic dam with the minimum required amount of cooling air to maintain an effective fluidic dam. Furthermore, injecting the cooling air at an angle in the direction of rotation reduces overall windage losses associated with the cooling air entering the airflows adjacent the rotating rotor, improving overall turbine efficiency. By reducing hot gas ingestion and increasing efficiency, time-on-wing increases as well.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A structure for a gas turbine engine, the structure comprising:
    a stator having an end wall and a discourager defining a channel therebetween with the end wall adjacent to a hot gas flow and the discourager adjacent to a purge flow;
    a rotor having an angel wing extending into the channel;
    at least one supply passage disposed within the stator and extending through the discourager; and
    at least one aperture fluidly coupling the at least one supply passage with the channel;
    wherein a flow of cooling air fed from the at least one supply passage to the at least one supply aperture and into the channel forms a fluidic dam between the hot gas flow and the purge flow.

2. The structure of claim 1 wherein the cooling air is fed at an angle in a direction of rotation.

3. The structure of claim 2 wherein the cooling air is fed at an angle being both axial and in the direction of rotation.

4. The structure of claim 1 further comprising a minimum clearance region between the angel wing and the discourager.

5. The structure of claim 4 wherein the cooling air is fed into the minimum clearance region.

6. The structure of claim 1 further comprising a plurality of vanes mounted to the stator wherein a pair of adjacent vanes define a nozzle.

7. The structure of claim 6 having one supply passage of the at least one supply passage and one aperture of the at least one aperture complementary to each nozzle.

8. The structure of claim 1 wherein the cooling air is injected at an angle in the direction of rotation of the rotor.

9. The structure of claim 8 wherein the cooling air is injected at an angle being both axial and in the direction of rotation of the rotor.

10. The structure of claim 1 further comprising a minimum clearance region between the angel wing and the discourager.

11. The structure of claim 10 wherein the cooling air is injected into the minimum clearance region.

12. The structure of claim 1 further comprising a plurality of vanes mounted to the stator wherein a pair of adjacent vanes define a nozzle.

13. The structure of claim 12 having one supply passage of the at least one supply passage and one aperture of the at least one aperture disposed complementary to each nozzle.

14. A method of minimizing hot gas ingestion within a gas turbine engine, the engine comprising a stator having an end wall and a discourager, defining a channel therebetween, with the end wall adjacent to a hot gas flow and the discourager adjacent to a purge flow, with a rotor including an angel wing disposed in the channel, the method comprising:
   injecting cooling air from at least one supply passage disposed within the stator and extending the discourager through at least one aperture in the discourager fluidly coupling the at least one supply passage with the channel;
   wherein a flow of cooling air fed from the at least one supply passage to the at least one aperture and into the channel forms a fluidic dam between the hot gas flow and the purge flow.

15. The method of claim 14 wherein injecting the cooling air through the at least one supply aperture further comprises injecting the cooling air at an angle in a direction of rotation of the rotor.

16. The method of claim 15 wherein injecting the cooling air further comprising injecting the cooling air into a minimum clearance region between the discourager and the angel wing.

* * * * *